United States Patent
Kao et al.

(10) Patent No.: US 7,212,490 B1
(45) Date of Patent: May 1, 2007

(54) DYNAMIC LOAD BALANCING FOR DUAL RING TOPOLOGY NETWORKS

(75) Inventors: Jung-Hong Kao, Los Altos, CA (US); Necdet Uzun, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 969 days.

(21) Appl. No.: 09/900,477

(22) Filed: Jul. 6, 2001

(51) Int. Cl.
*H04L 12/28* (2006.01)
*H04L 12/56* (2006.01)

(52) U.S. Cl. ....................... 370/222; 370/406

(58) Field of Classification Search ........ 370/229–238, 370/252, 405–406, 440; 709/238–244
See application file for complete search history.

(56) References Cited

U.S. PATENT DOCUMENTS

| | | | |
|---|---|---|---|
| 4,768,190 A * | 8/1988 | Giancarlo | 370/400 |
| 5,546,542 A * | 8/1996 | Cosares et al. | 709/241 |
| 6,454,977 B1 * | 9/2002 | Kwok et al. | 264/104 |
| 6,456,588 B1 * | 9/2002 | Simmons | 370/216 |
| 6,490,244 B1 * | 12/2002 | Pegrum et al. | 370/216 |
| 6,721,269 B2 * | 4/2004 | Cao et al. | 370/227 |
| 6,744,769 B1 * | 6/2004 | Siu et al. | 370/395.32 |
| 6,819,662 B1 * | 11/2004 | Grover et al. | 370/351 |
| 2001/0032269 A1 * | 10/2001 | Wilson | 709/235 |
| 2002/0118687 A1 * | 8/2002 | Chow et al. | 370/404 |
| 2002/0118700 A1 * | 8/2002 | Bruckman | 370/460 |
| 2002/0141345 A1 * | 10/2002 | Szviatovszki et al. | 370/238 |
| 2002/0186667 A1 * | 12/2002 | Mor et al. | 370/258 |
| 2003/0206527 A1 * | 11/2003 | Yim | 370/238 |
| 2005/0030961 A1 * | 2/2005 | Lee et al. | 370/404 |

OTHER PUBLICATIONS

D. Tsiang, G. Suwala, "The Cisco SRP MAC Layer Protocol," Network Working Group, Request for Comments: 2892, Category: International, Cisco Systems, Aug. 2000, pp. 1-52.

* cited by examiner

*Primary Examiner*—Seema S. Rao
*Assistant Examiner*—Hong Sol Cho
(74) *Attorney, Agent, or Firm*—Campbell Stephenson Ascolese LLP

(57) ABSTRACT

A method and apparatus for servicing transmit traffic in a node of a network where the network includes a plurality of nodes connected by first and second rings formed by two or more transmission media. The method includes receiving transit delay data associated with a plurality of downstream nodes, receiving a packet for routing to a destination node in the network and routing the packet to one of the first and second rings not only based on a shortest path to the destination node but also on a transmit latency for both the first and second rings in view of the received transit delay data.

11 Claims, 8 Drawing Sheets

| Address (MAC, IP) | HOP Count Inner | HOP Count Outer | Latency Inner | Latency Outer | Static Ring Direction | Dynamic Ring Direction |
|---|---|---|---|---|---|---|
| 12, 23, 46 | 10 | 8 | 1234 | 1456 | I | O |
| 12, 23, 47 | 9 | 9 | 1200 | 1400 | I | I |

Fig. 5

DYNAMIC LOAD BALANCING FOR DUAL RING TOPOLOGY NETWORKS

BACKGROUND

The present invention is directed to network communications.

A communications network such as network 100 of FIG. 1 may include a plurality of stations or nodes (nodes A–F) coupled by transmission media (e.g., cable wire or optical fiber) providing a path for the transmission of data (e.g., E-mail, video, multimedia, or voice) between two or more nodes (e.g. transmission media 140 between nodes A and B, and transmission media 141 between nodes B and C). The data can be transferred in accordance with a network protocol (e.g., Internet Protocol (IP), asynchronous transfer mode (ATM), or synchronous optical network/synchronous digital hierarchy (SONET/SDH)) over optical transmission media. The network 100 may include one or more central nodes and one or more branch nodes connected by an inner ring 126 and an outer ring 146. In this type of network configuration (a dual-ring topology), data can be transmitted from a source node to a destination node (often through intermediary nodes) by transmitting data along one of the two rings (e.g., inner ring 126 and outer ring 146), where the rings have traffic flowing in opposing directions (clockwise direction 110 or counterclockwise direction 111). Control information can be routed in a direction opposite the control information's respective data. As data enters each successive node, local data is split off and transit data passes through the node along the ring. In addition, local data may be added at each node (i.e., transmit data), integrated with the transit data and forwarded on a respective ring to a next node in the network.

In a conventional network using a dual-ring topology, the network can become congested for a variety of reasons. Nodes may oversubscribe and add or forward more data than is expected. Congestion on one ring can in turn cause congestion on the other ring. Congestion management on a conventional network includes the use of logic to monitor and control congestion issues. In a conventional dual ring topology network, when a node is forwarding an excessive amount of transit traffic, the node may communicate its derived usage information to an immediately upstream node via the opposite ring. The upstream node may then adjust its transmission rate (e.g., stop adding data at the upstream node from the upstream node's host to the congested ring). However, in the conventional systems proposed, the usage information provided by a downstream node is limited. The previously proposed systems provide no means for monitoring congestion at other nodes in the network other than a single downstream node.

Data is received in a node (e.g., node B) along a transmission media (e.g., transmission media 140 of outer ring 146 (FIG. 1)). The data received is generally in packet format, where each packet has a header, indicating source and destination information. Data packets are routed using the destination information in the packet header to determine if the packet is destined for the local host (local traffic) or destined for a given ring (transit traffic).

Each node on the ring includes two full duplex ports. One is connected to the inner ring 126 and one is connected to the outer ring 146. A Spatial Reuse Protocol Forwarding (SRPF) block in the node arbitrates between the transit traffic and the host data received (transmit traffic), multiplexing the transit traffic and host data using SRP fairness logic, such as the fairness logic described in "The Cisco SRP MAC Layer Protocol", by Tsiang and Suwala, RFC 2892 (August 2000). The SRP fairness logic is a transmission control logic, which attempts to ensure that nodes get equal usage. The SRP fairness logic determines if a node is sourcing or forwarding an excessive amount of traffic and either imposes rate controls and/or originates and propagates fairness information, requesting that an immediately upstream node adjust its transmission rate. The logic can also be used to prioritize packets and expedite the handling of priority packets.

The SRP fairness logic also includes logic for determining on which ring traffic from a given node is to be added. Typically, ring selection is determined based on a shortest path determination. When packets are received from a host, ring selection algorithms in the SRP fairness logic seek out the shortest path to a destination. By selecting the shortest path, system designers hope to make the best use of system resources. When making decisions regarding adding new packets to a given ring, conventional systems have not previously taken into consideration actual congestion on a given ring. When only path length is considered, added congestion can arise. For example, the traffic load might not be balanced between the two rings. As such, a packet added to a ring that is congested may take longer to traverse the shortest path than if the packet were placed on the other ring (i.e., transit time on the ring with less hop count may be longer than the transit time on the ring with less traffic).

For certain types of packets, other ring selection algorithms are used. For example, with multicast/broadcast traffic, there is no single destination. As such, the shortest path algorithm is not used. For multicast/broadcast traffic, ring selection for each packet can be made using media access control (MAC) addressing techniques. The traffic can be distributed to the rings by hashing the MAC address associated with the traffic. However, the traffic load will be bound to the MAC address distribution.

SUMMARY

In one aspect, the invention provides a method for servicing transmit traffic in a node of a network where the network includes a plurality of nodes connected by first and second rings formed by two or more transmission media. The method includes receiving usage data from a downstream node where the usage data includes transit delay data associated with a plurality of downstream nodes. The method includes receiving a packet for routing to the network, determining a shortest path to a destination node including identifying one of the first and second rings as being associated with the shortest path, determining if the identified one of the first and second rings is more congested than the other of the first and second rings using the transit delay data and, if so, routing the packet to the destination on the other ring irrespective of the shortest path determination.

Aspects of the invention can include one or more of the following features. The method can include determining transit delay data for the node, appending the transit delay data for the node to the received transit delay data and forwarding the transit delay data including appended transit delay data to an upstream node. The step of appending transit delay data can include identifying transit delay data associated with a node farthest away from the node and dropping the transit delay data associated with the node farthest away from the node prior to appending the node's transit delay data. The transit delay data received can be of the form of a plurality of vectors each reflecting the transit delay for their respective node. The step of receiving usage data can include receiving transit delay data from 32 downstream nodes.

The method can include determining a latency metric indicative of a delay between the node and the destination node. The step of determining if a ring is more congested can include comparing the latency metrics associated with the destination node for each ring. The method can include determining an average transit delay for each the plurality of nodes computed as the average of a previously determined average transit delay for a given node and newly received delay data associated with the given node. The latency metric can be computed as the mathematical average of a previously calculated latency metric indicative of a delay for nodes between the node and the given one of the plurality of downstream nodes and a newly calculated latency metric for a same path based on the received transit delay data. The step of determining if the identified one of the first and second rings is more congested than the other of the first and second rings can include using the average transit delay data computed for each of the plurality of downstream nodes.

The method can include recognizing when a packet may be part of a flow, storing flow information for a flow when a routing decision is made that routes a packet in a direction that is not consistent with the shortest path where the flow information includes a flow direction selected and a timer, receiving another packet that is part of the flow and determining if a timeout period has expired since a last packet in the flow was sent based on the timer. If the timeout period has not expired, then the method can include routing the another packet to the destination based on the flow information including in a direction determined by the flow direction and updating the timer to reflect a start of a new timeout period. The method can include setting the timer to an initial value that is the greater of the latency period between the node and the destination node on both rings.

The step of updating the timer can include setting the timer to a new value that is the greater of a current latency period between the node and the destination node on both rings. The method can include determining if the destination node is farther away from the node than a predefined number of hops, and if so, routing the packet to the destination node based on the shortest path. The predefined number of hops can be 32. The method can include a check to determine if a break has been detected in the network on one of the first and second rings, and if so, routing the packet to the destination node based on the shortest path.

The method can include storing in a table of destination nodes a hop count reflecting a hop count between the node and the given destination node for each of the first and second rings where the latency metric can reflect the congestion between the node and the given destination node for each of the first and second ring, a static ring selection based on the hop count and a dynamic ring selection based on the latency metrics reflective of the congestion in the first and second rings between the node and the given destination node.

The method can include calculating a latency metric as the mathematical average of a previously calculated latency metric and an average transit delay for all nodes between the node and the given destination node. The average transit delay can be weighted based on the number of hops between the node and the given destination node. The transit delay data can be a measure of the amount of traffic in a low priority queue of a given downstream node.

In another aspect, the invention provides a method for servicing transmit traffic in a node of a network where the network includes a plurality of nodes connected by first and second rings formed by two or more transmission media. The method includes receiving transit delay data associated with a plurality of downstream nodes, receiving a packet for routing to a destination node in the network and routing the packet to one of the first and second rings not only based on a shortest path to the destination node but also on a transmit latency for both the first and second rings in view of the received transit delay data.

In another aspect, the invention provides a node in a network including a plurality of nodes connected by first and second rings formed by two or more transmission media. The node includes fairness logic configured to receive usage data from a downstream node including transit delay data associated with a plurality of downstream nodes, receive a packet from a host associated with the node for routing to the network, determine a shortest path to a destination node including identifying one of the first and second rings as being associated with the shortest path, determine if the identified one of the first and second rings is more congested than the other of the first and second rings using the transit delay data and, if so, routing the packet to the destination on the other ring irrespective of the shortest path determination. The fairness logic can be configured to track flows associated with a node including remembering a last ring on which packets of the flow were forwarded to the node and setting a timer to a value reflective of a longest amount of time a packet will take to reach the node on either ring, receive a packet that is part of a flow and route the packet to the node using the last ring if the timer is unexpired.

Aspects of the invention can include one or more of the following advantages. A system is proposed that maximizes the bandwidth utilization for both rings. Ring decisions are not made solely on hop count, but also on the transmit latency for both rings. The system provides efficient congestion management including logic for processing latency information from more than one upstream node. Usage packets including transit delay information for plural downstream nodes are evaluated as part of the ring selection process for a given node. The latency information is used along with the hop count to determine a routing decision (i.e., which ring) for packets added to the network.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 5 shows an example of a topology table.

Like reference symbols in the various drawings indicate like elements.

DETAILED DESCRIPTION

The present invention provides a system and method for traffic management on a dual-ring topology communication network. A number of terms are used herein to describe network transmissions and related structures and processes.

"Transit traffic" refers to traffic received at a node on a ring that is destined for another node in the ring or another element of the communication network and as such is merely passed through the respective node. Transit traffic is stored at least temporarily in a transit traffic buffer. The transit traffic buffer can include low and high priority queues.

"Transmit traffic" refers to traffic received at a node from a node's respective host that is to be added to a ring. The transmit traffic is also stored at least temporarily in a transmit buffer prior to introduction to the ring. The transmit traffic and transit traffic buffers are serviced in accordance with fairness logic that is described in greater detail below.

"Usage data" (u) refers to a value received from a downstream node that describes the usage of the downstream node.

"Usage packet" refers to a periodically generated data packet that is sent to an upstream node in the network that includes usage data. The usage packet can also include transit delay information for a plurality of downstream nodes in the network.

"Transit delay" refers to the measured delay in a given node for low priority transit traffic. The transit delay can be measured by the amount of traffic in a low priority queue of the transit buffer for a given node. Alternatively, the transit delay can be measured based on an average amount of time a packet waits in the transit buffer prior to being forwarded onto a ring of the network.

"Instantaneous transit delay vector" refers to a measurement of the transit delay of a given node at a given time. The instantaneous transit delay vector for plural downstream nodes in a network can be included in a usage packet.

"Average transit delay vector" refers to the transit delay a packet may expect to experience when processed by a particular node in the network. In one implementation, the average transit delay vector for a node is calculated as the mathematical average of all received incoming instantaneous transit delay vectors for a given node over a period of time. In an alternative implementation, the average transit delay vector is the mathematical average of a previously calculated average transit delay vector and a newly received instantaneous transit delay vector for a given node.

"Latency metric" refers to the total delay between the current node and a downstream node in the network on a given ring. In one implementation, the metric can include the hop count propagation delay and average transit delay in buffer (i.e., total average transit delay vector for all nodes) between the current node and a given downstream node.

Figure 1:
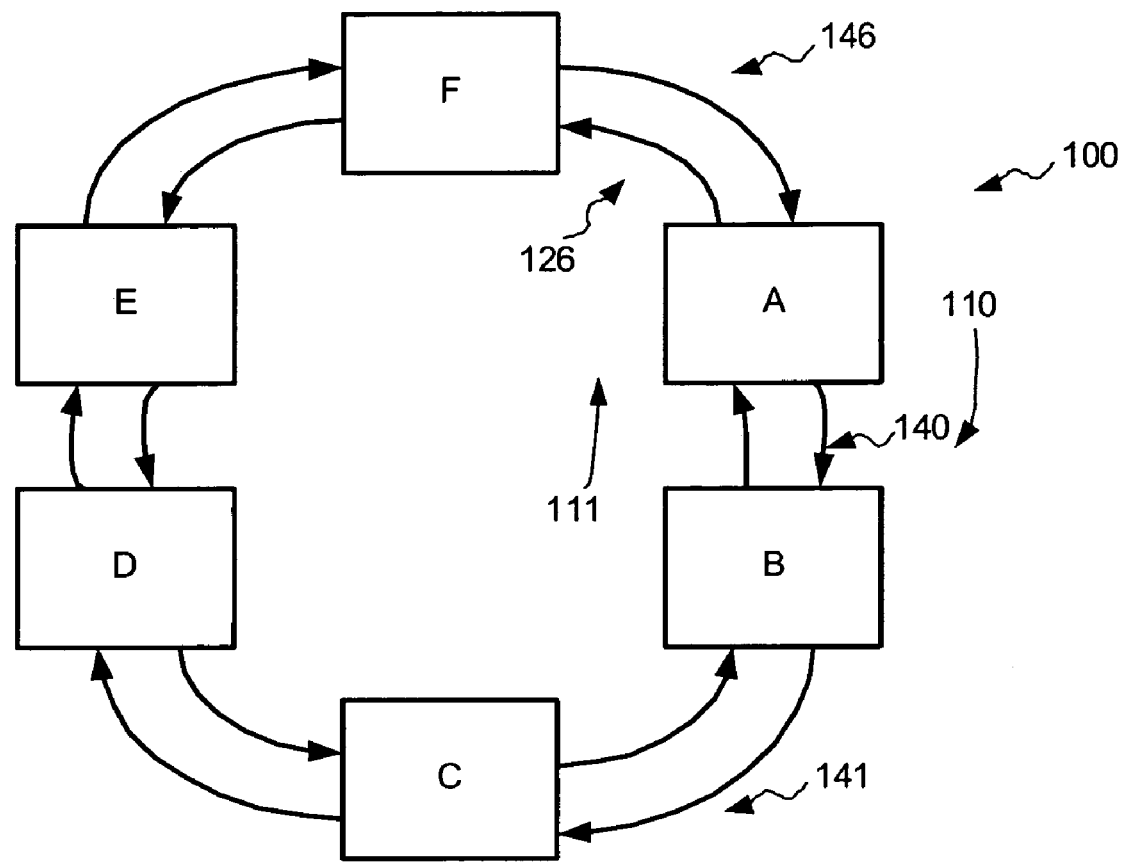
FIG. 1 is a diagram of a prior art six-node bi-directional ring topology network.
Figure 2:
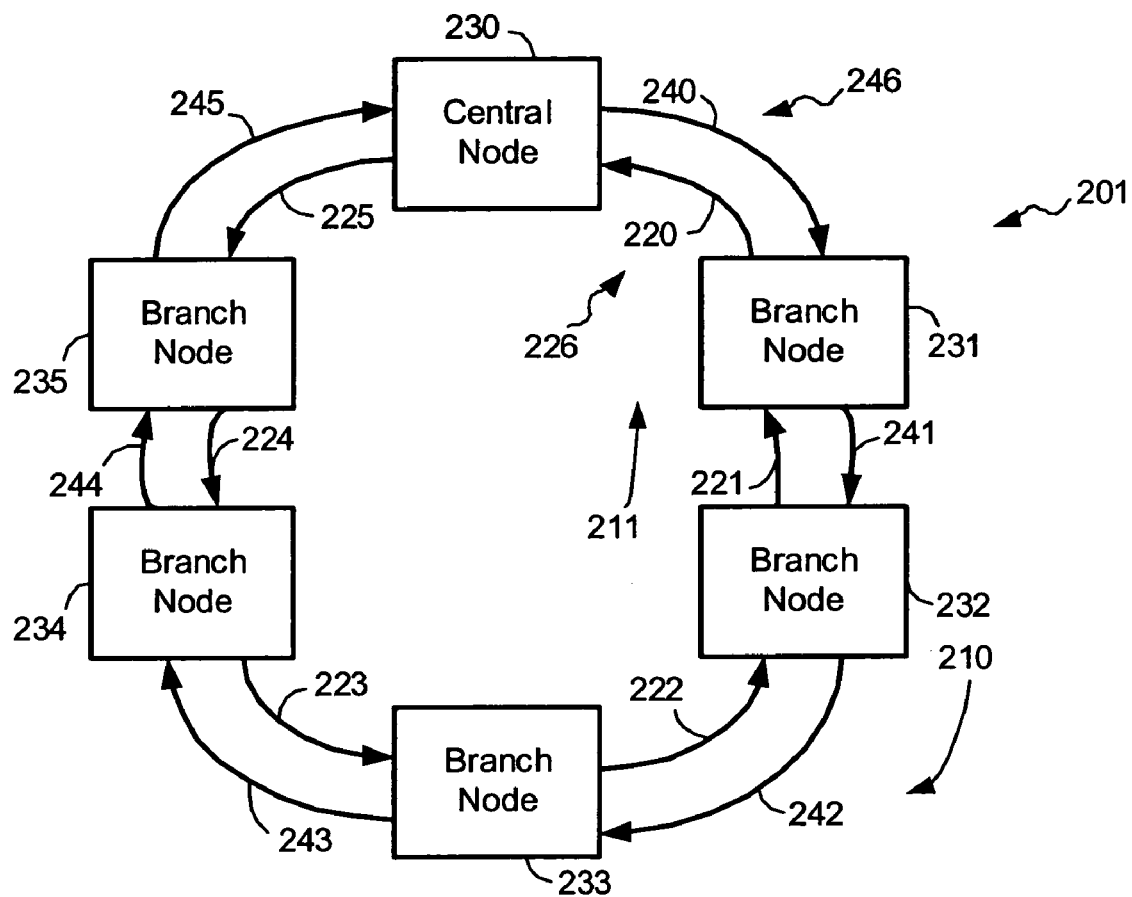
FIG. 2 is a diagram of a six-node bi-directional ring topology network.

Referring to FIG. 2, network 201 includes a six-node bi-directional dual ring topology. Network 201 may represent without limitation a metropolitan area telecommunications system, a local or wide area network, or a cable television network. Central node 230 is connected to branch nodes 231–235 via transmission media 220–225 (forming an inner ring 226) and 240–245 (forming an outer ring 246). Central node 230 can be configured to forward data to a destination external to the inner and outer rings 226 and 246 such as other networks (for example LANs or WANs). Central node 230 can also receive data from external destinations for forwarding to branch nodes 231–235. Inner and outer rings (226 and 246) may concurrently transport data in opposing directions. Control information associated with the data may be routed in the direction opposite to the direction in which the data associated with the control information is routed. Control information may include IPS (Intelligent Protection Switching) packets, usage packets, and topology discovery packets. IPS packets may include information about the network 201. Usage packets indicate the usage of the network's resources and include congestion information. In one implementation, each usage packet includes usage information for one or more downstream nodes. In one implementation, the usage information includes a field that includes the low priority transit delay vector for up to 32 downstream nodes in the network. Usage packets are discussed in greater detail below. Topology discovery packets may be used to discovery information about the network 201. One use of topology discovery packets is described in greater detail below in association with FIG. 3c.

Figure 4:
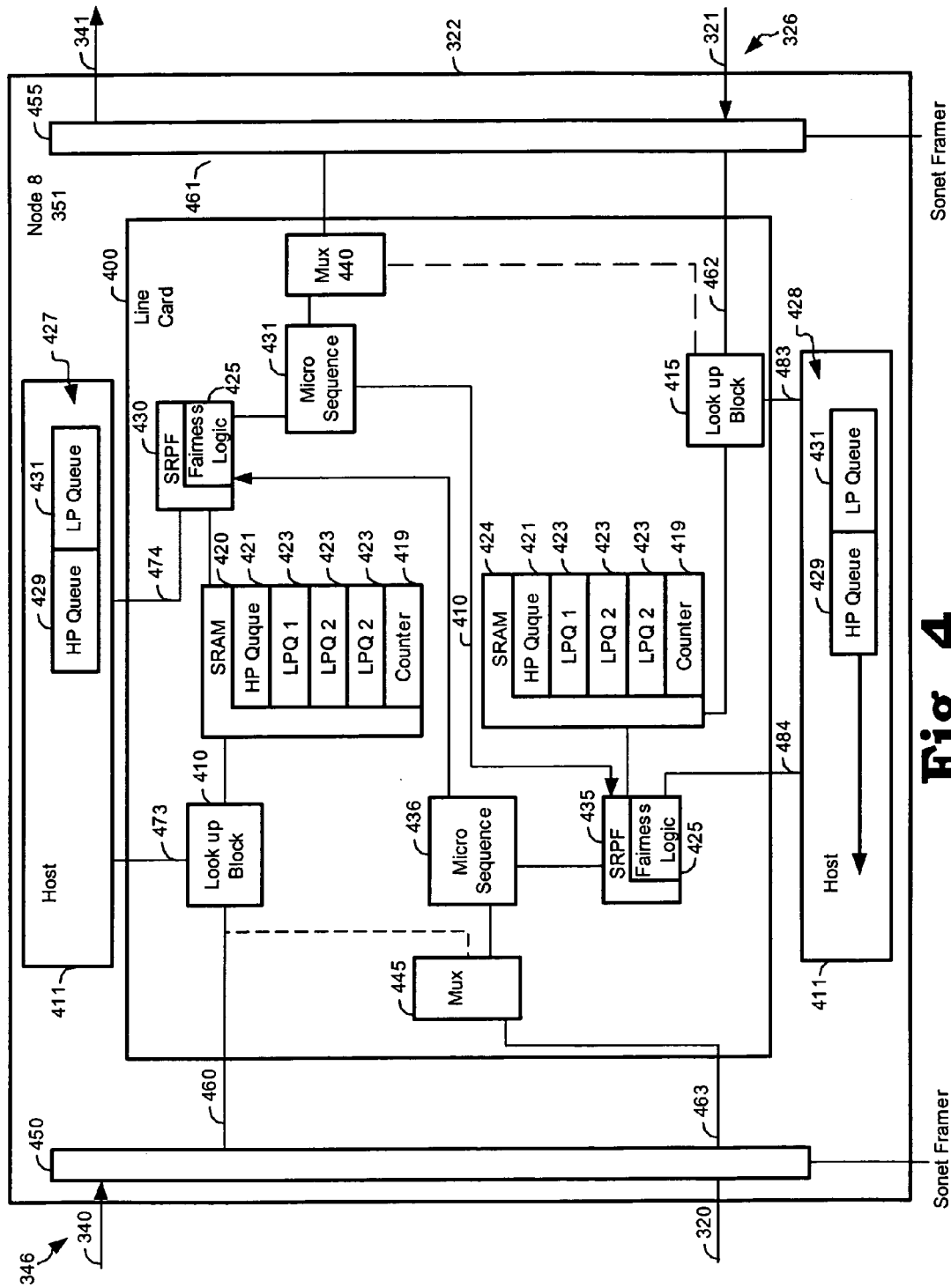
FIG. 4 is a diagram of node B of FIG. 2.

Branch nodes 231–235 may each be associated with a host (such as a network processor) (not shown), and contain a number of line cards (such as line card 400, FIG. 4), and one or more physical layers, such as SONET framers (450 and 455, FIG. 4). Each line card may exist on a single semiconductor chip.

Transmission media 220–225 and 240–245 may be fiber or cable or any other transmission media. Transmission media 220–225 route data from one node to another in counterclockwise direction 211. Transmission media 240–245 route data from one node to another in clockwise direction 210. Data transmitted along inner and outer rings 226 and 246 may include without limitation streaming video, E-mail, multimedia, or voice over IP. The data may be transmitted as packets, with headers indicating source and destination addresses.

Nodes 230–235 may be operable to receive data from any other node in the network or directly from a host (input 474 of FIG. 4 receiving information from a host 411 along the outer ring 246, and input 484 of FIG. 4 receiving information from a host 411 along the inner ring 226). When non-adjoining nodes communicate, data passes through intermediary nodes. Once data reaches its destination, the data is stripped from the incoming stream of data (e.g., dropped data). Stripping may be accomplished with a lookup table based on the destination address. Data packets that are not stripped (i.e., transit data) are multiplexed with any new data arriving from the host (i.e., transmit data) and routed along a respective inner or outer ring (226 or 246).

FIG. 4 shows a node of FIG. 2 in more detail. Data is received in the node (e.g., node 231) along a transmission media (e.g., transmission media 240 of outer ring 246 (FIG. 2). Data may be received in packet format, where each packet has a header, indicating source and destination information. Data packets may be routed through physical layer 450, into line card 400 and be received by lookup block 410 along path 460. Lookup block 410 may consist of a lookup table. Lookup block 410 may use the destination information in the packet header to determine if the packet is destined for the host 411 (local traffic) or destined for the outer ring 246 (transit traffic). Local traffic may be forwarded to the host via output 473.

The lookup block 410 also performs a forwarding function, forwarding transit traffic to a local buffer-SRAM (Static Random Access Memory) 420, and can perform a stripping function, stripping information from particular sources based on the source information in the header. The stripping function may prevent the host from receiving packets from undesirable sources. Transit traffic is routed to, and stored in, SRAM 420. SRAM 420 can include two classes of transit queues, high priority and low priority. In one implementation, SRAM 420 includes one high priority transit queue 421 and a plurality (i) of low priority queues ($423_{1-i}$). A low priority queue counter 419 is provided to keep track of the total number of bytes in all of the low priority queues 423. In one implementation, the low priority queues are treated as a set for the purposes of forwarding decisions and latency calculations. However, the low priority queues can be serviced in accordance with a strict priority or in weighted round robin (wrr) fashion. Accordingly, service differentiation can be provided among the various low priority queues. The low priority queue counter 419 provides an indication of the total amount of traffic in all low priority transit queues 423, which information can be used in conjunction with information derived from the high priority transit queue 421 to make forwarding decisions. By only maintaining two classes of transit queues, forwarding algorithms that are used in making forwarding decisions can converge quickly providing performance advantages. Forwarding decisions are described in greater detail below.

A Spatial Reuse Protocol Forwarding (SRPF) block 430 may arbitrate between the transit traffic stored in SRAM 420 (i.e., traffic stored in high priority transit queue 421 and the plurality of low priority transit queues 423) and the host data received at input 474, multiplexing the transit traffic and host data optionally using weighted SRP fairness logic 425. The host data is stored in a host buffer 427 that can include high 429 and low priority transmit queues 431. The weighted SRP fairness logic 425 is a transmission control logic, which ensures that nodes get fair usage. The weighted SRP fairness logic may determine if a node is sourcing or forwarding an excessive amount of traffic and either impose rate controls or originate and propagate fairness information, requesting that upstream nodes adjust their transmission rates. The logic can also be used to prioritize packets and expedite the handling of priority packets. Each node 230–235 of FIG. 2 may use the weighted SRP fairness logic 425 to monitor the number of packets sourced and forwarded by the inner and outer rings 226 and 246. When a node is sourcing or forwarding an excessive amount of traffic, the node may communicate this usage information to upstream nodes via the opposite ring. The upstream nodes may then adjust their transmission rates. The details of the information passed upstream and the effect on forwarding decisions is described in greater detail below.

Traffic data (usage packets) can be communicated to the weighted SRP fairness logic 425 running in SRPF 435 through the use of a microsequencer 431 placed in outer ring 246 between the SRPF 430 and the multiplexer 440. The microsequencer 431 may be connected to the SRPF 435 on the inner ring 226, thus communicating traffic data to the opposing ring. Since control information flows in the opposite direction as data it measures, the traffic data communicated to the SRPF 435 will reflect the traffic on the inner ring 226. The traffic data can be used by SRPF 435 to regulate traffic on the inner ring 226. Similarly, traffic data can be communicated to the weighted SRP fairness logic running in SRPF 430 through the use of a microsequencer 436 placed in inner ring 226 between the SRPF 435 and the multiplexer 445.

Once data has been routed out of SRPF 430, the data passes through multiplexer 440 and out path 461. The data is routed through the physical layer 455 and back to outer ring 246 (FIG. 2) via transmission media 241.

Similarly, data is received in the node (e.g., node 231) along transmission media 221 of inner ring 226 (FIG. 2). Data packets may be routed through physical layer 455, into line card 400 and into lookup block 415 along path 462. Local traffic may be forwarded to the host 411 via output 483. Transit traffic may be forwarded to and stored in SRAM 424. SRPF block 435 may arbitrate between the transit traffic stored in SRAM 424 and the host data received at input 484, multiplexing the transit traffic and host data using the weighted SRP fairness logic 425. Once data has been routed out of SRPF 435, the data passes through multiplexer 445 and out path 463. The data is then routed through the physical layer 450 and back to inner ring 226 (FIG. 2) via transmission media 220 (FIG. 2).

Routing Decisions for Host Traffic

Figure 3A:
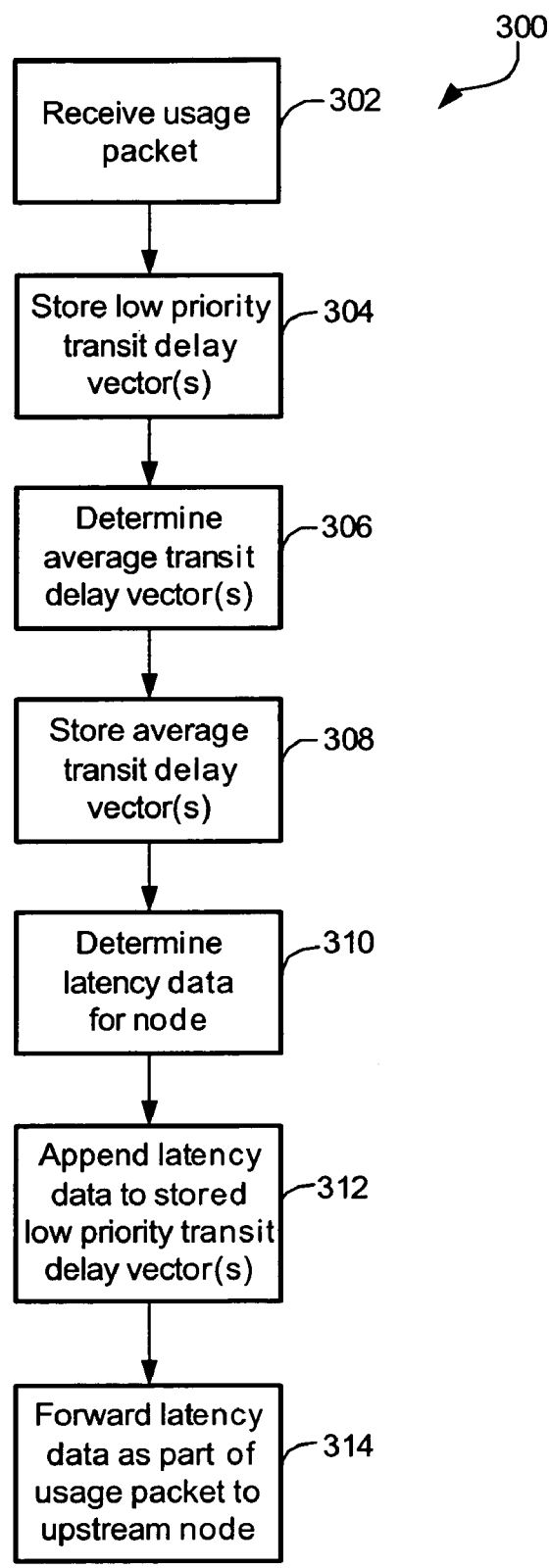
FIG. 3a is a flow chart illustrating a process for congestion management in a node when making ring decisions.
Figure 3B:
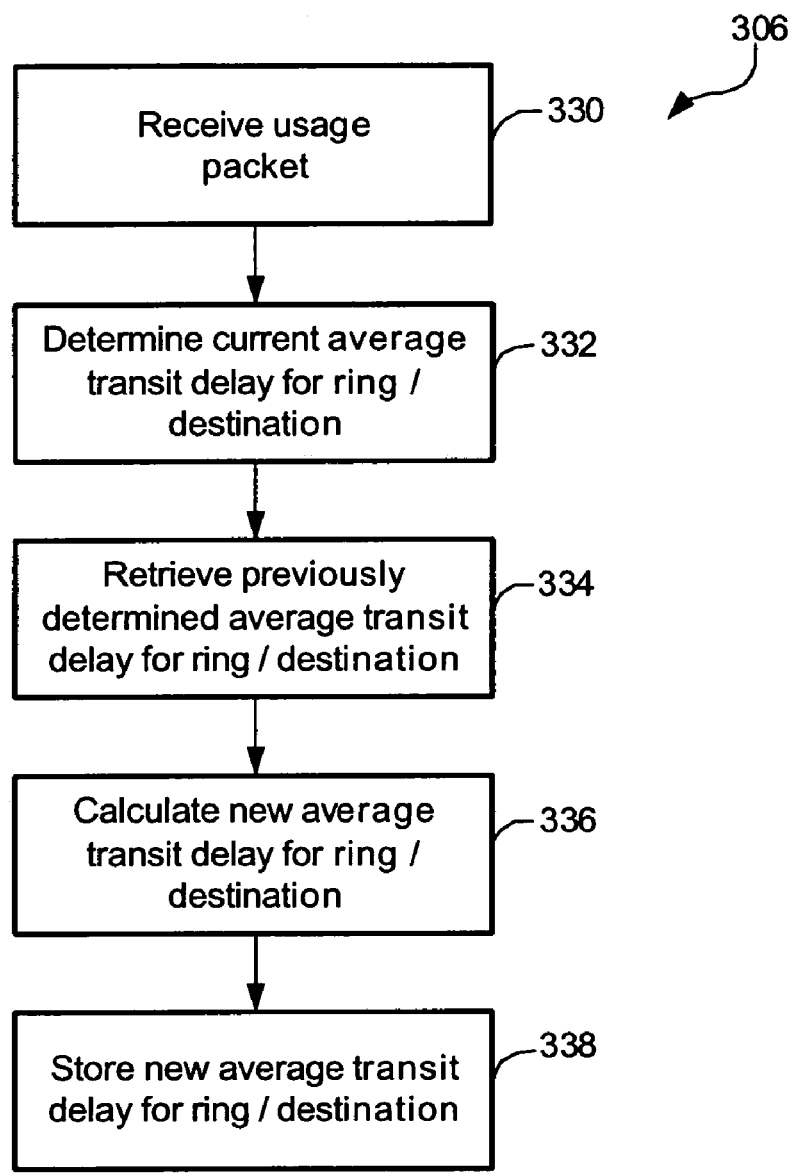
FIG. 3b is a flow chart illustrating a method for determining an average transit delay.

Referring now to FIG. 3a, a process is shown as implemented in the weighted fairness logic 425. The process 300 is implemented in each node of network 201 and is used to make routing decisions for traffic that is added to the network from the host (e.g., transmit traffic). Process 300 includes numerous steps. Each step may itself include numerous sub-steps as set forth below in FIG. 3b. The process 300 begins with the receipt of a usage packet from a downstream node (302). In one implementation, the usage packet includes usage data (u) and a low priority transit delay vector for a plurality of downstream nodes. The process continues by storing the received low priority transit delay vector information as the instantaneous transit delay vector for the node (304). An average transit delay vector is thereafter determined (306) and stored (308). The calculation of the average transit delay vector is described in greater detail in FIG. 3b. Weighted fairness logic 425 (FIG. 4) includes ring selection algorithms for determining which ring on the network 201 is to be used when new host transmit traffic is received. The ring selection process uses the average transit delay vector data in making routing decisions. The ring selection process is described in greater detail below in association with FIGS. 3c–d.

Returning to process 300, usage data for the node is determined including latency data for the node (310). In one implementation, the latency data is a measure of the amount of data in the low priority transit queue for the current node. Thereafter, the latency data is stored (312). In one implementation, the latency data is appended as a vector to the instantaneous transit delay vector data stored in the node. Each usage packet includes transit delay vectors for up to 32 downstream nodes. Each transit delay vector can be a four-bit value that reflects the amount of data in the low priority transit queues for a respective node. The four-bit value can be in units of decay interval for the interface which can be 8,000 octets at OC-12, 32,000 octets at OC-48 and 128,000 octets at OC-192. In this implementation, the latency data for a given node can be appended to the instantaneous transit delay vector by left shifting four-bits the instantaneous transit delay vector and appending a four-bit vector representing the low priority transit delay for the current node.

Returning to process 300, a usage packet including transit delay vectors for the node and plural downstream nodes is then forwarded on the opposite ring to an upstream node (314). The process can be repeated each time a usage packet is received. Alternatively, the portions of the process that relate to processing the received usage data (steps 302–308) can be invoked at one time (e.g., when a usage packet is received from a downstream node), while the portions of the process that relate to the generation of usage data for a given node (steps 310–314) can be invoked at a different time (e.g., in accordance with a predefined trigger). In one implementation, usage packets are generated approximately every 100 microseconds Average Transit Delay Vector Referring now to FIG. 3b, a process for determining the average transit delay vector (i.e., a run-in average transit delay vector) for a node is shown (i.e., step 306 of process 300 shown in FIG. 3a). The process begins with the receipt of a usage packet including transit delay vectors for a plurality of downstream nodes (330). The average transit delay for the destination can be determined using the received instantaneous transit delay vector data for the given (i.e., destination) node. More specifically, the instantaneous transit delay for the destination node is identified (332). Thereafter, the previously calculated average transit delay for the destination can be retrieved from memory (334). An average transit delay for the given destination can then be determined using the retrieved previously calculated average transit delay data and the newly received instantaneous transit delay vector data (336). The average transit delay vector can be calculated as the mathematical average, weighted average or decaying average of the prior calculated average transit delay vector and the newly received instantaneous transit delay vector. Thereafter, the average transit traffic delay data is stored (i.e., displacing any previously calculated average transit traffic delay data in memory) (338). In one example above, delay transit information (i.e., instantaneous transit delay vectors) from 32 downstream nodes is received as a series of vectors. In this example, the process calculates the average delay for the ring between the current ring and each node of the 32 downstream nodes, producing a 32 vector average transit delay data.

Ring Selection

Figure 3C:
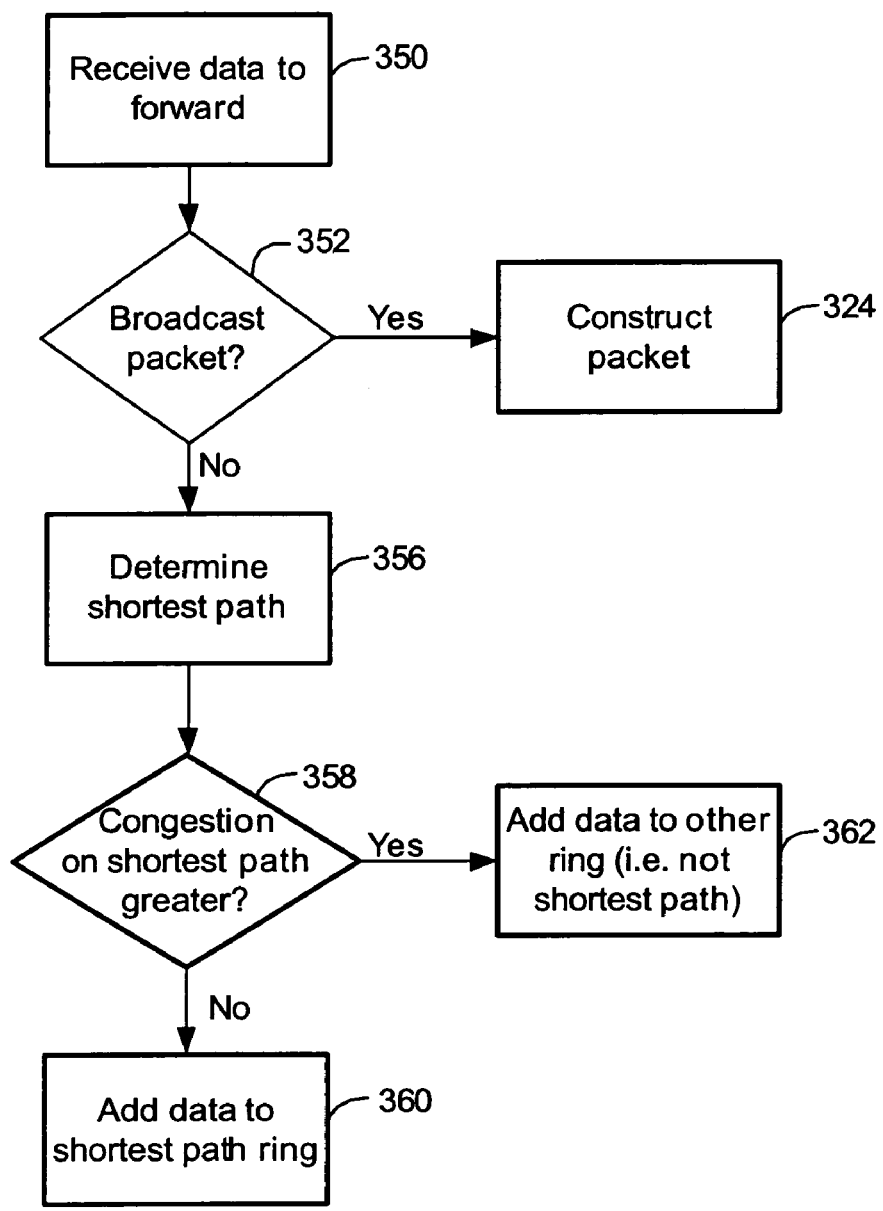
FIG. 3c is a flow chart illustrating a ring selection process.

Referring now to FIG. 3c, a dynamic ring selection protocol for determining which ring in the network to add transmit (host) data is described. The protocol begins with the receipt of data at the host to forward to the network (350). A check is made to determine if the packet is a multicast/broadcast packet (352). If so, then a multicast/broadcast protocol is invoked to determine which ring to select for the broadcast data (354). The multicast/broadcast protocol is described in greater detail below. If the packet is not multicast/broadcast traffic, then the packet's destination information is evaluated to determine a shortest path to the destination (356). The shortest path determination can be made based on data stored in the node or developed from topology discovery packets. A check is then made to determine if the congestion on the ring associated with the shortest path is greater than the congestion on the other ring (358). In one implementation, the congestion check is made by comparing a latency metric for a given node for each ring. Latency metrics are discussed in greater detail below. If the congestion on the ring associated with the shortest path is less than the congestion on the other ring, then the packet is added to host transmit buffer associated with the shortest path ring (e.g., host buffer 427, 428) (360). If the ring associated with the shortest path is more congested than the other ring, then the packet is routed on the less congested ring (362).

In one implementation, the process is amended (prior to routing the packet to a particular transmit buffer) to include a check to determine if the number of hop counts exceeds a predefined number. In one implementation, the predefined number is 32 hop counts, where the number of hop counts is selected to be equal to the number of transit delay vectors received as part of a usage packet (i.e., the number of downstream nodes whose delay information is received at a current node as part of a usage packet). If the number of hop counts exceeds the predefined number, then ring selection can be based on shortest path alone. Alternatively, the ring selection can be made based on the delay information that is available (dynamic ring selection) even where all of the delay information between the current node and a given destination node may not be known.

In one implementation, the process may also be amended to include a consideration for media (e.g., fiber optic) breaks in the network. In this implementation, a check is added to determine if there are any breaks in the media connecting nodes on the network. If breaks are detected, then the shortest path determination can be exclusively used to determine ring selection for transmit traffic.

Topology Discovery Packets

Each node in the network sends out topology discovery packets periodically on each of the inner and outer rings to collect topology information. In one implementation, the information gathered is stored in a topology table and used in making routing decisions for host packets. An example of a topology table that includes topology information is shown in FIG. 5.

Each entry includes an address 502 (e.g., a MAC address) for a node (e.g., a destination node) discovered in the network. Hop count data for each of the inner 504 and outer rings 506 is determined and stored for each node as a measure of the number of hops from the current node. A latency metric for each of the inner 508 and outer rings 510 is determined and stored for each node. The latency metric can be calculated as the amount of delay between the current node (the node that is generating and storing the table) and a given destination node (an entry in the table) on a given ring. In one implementation, the latency metric is determined based on the transit delay vectors for all nodes between the current node and the node entry on a given ring (e.g., the sum of the average transit delay vectors associated with a given path). The latency metric can be updated as each usage packet is received and processed. In one implementation, the latency metric is the sum of the average transit delay vectors for all nodes between the current node and the node entry. In one implementation, the latency metric is determined to be the sum of a previously calculated latency metric and a current latency metric calculated using weighted average transit delay vectors associated with the particular path between the current node and a destination node on a ring. Each weighted average transit delay vector can be calculated to be the sum of a weighted decay interval and the average transit delay vector associated with a given node along the path to the destination. The weighted decay interval can take into consideration the number of hops and the propagation delay between the current node and the given destination node.

The table can also include a static ring direction 512 and a dynamic ring direction 514. The static ring direction 512 indicates the ring that should be selected based on a shortest path determination. The dynamic ring direction 514 indicates a ring selection based on the dynamic ring selection protocol described above in association with FIG. 3c (shortest path and shortest time protocol). When new packets are received, the table can be indexed (based on destination data for the packet) to determine proper ring selection. In one implementation, aging timers are associated with entries in the table. The use of aging timers is discussed in greater detail below.

The usage packet processing method described above with respect to FIG. 3a can be augmented to include updating table entries. More specifically, for each entry, a new latency metric can be calculated based on the received transit delay vectors for all nodes between the current node and the node entry. Based on the new latency data and hop count data, a new dynamic ring direction can be determined for a given destination node. Alternatively, at a predefined decay interval, the dynamic ring selection protocol can be invoked to update the dynamic ring direction for each entry (MAC address) based on the latency data received (i.e., the transit delay vectors).

Net Flow

In one implementation, flow information is maintained in a table (i.e., a flow table) and is used in the ring selection process. Net flow information is stored in the flow table to guarantee the ordering for packets within the same flow. The net flow information includes a ring direction and a timer. The ring direction indicates the last ring direction for packets in a given flow. The timer is an aging timer that is used to determine when a flow has expired. Net flow information ensures that packets in a same flow arrive in a proper order at a destination node.

In one implementation, the period of the aging timer is set to be the longer of the transit delay of either ring between the current node and a given destination node. Accordingly, if the last packet sent was older than the transit delay of either ring, the network can be assured that any new packet received to be routed to the destination will not "pass" an older packet in transit by using an alternative route (the other ring). The timer in the net flow information can be initialized with a maximum value reflective of the larger of the transit delays for a given ring. The timer can be decremented until the flow has expired. Entries are added to the net flow table each time an IP or MPLS packet is received at a given node for routing to the network.

Figure 3D:
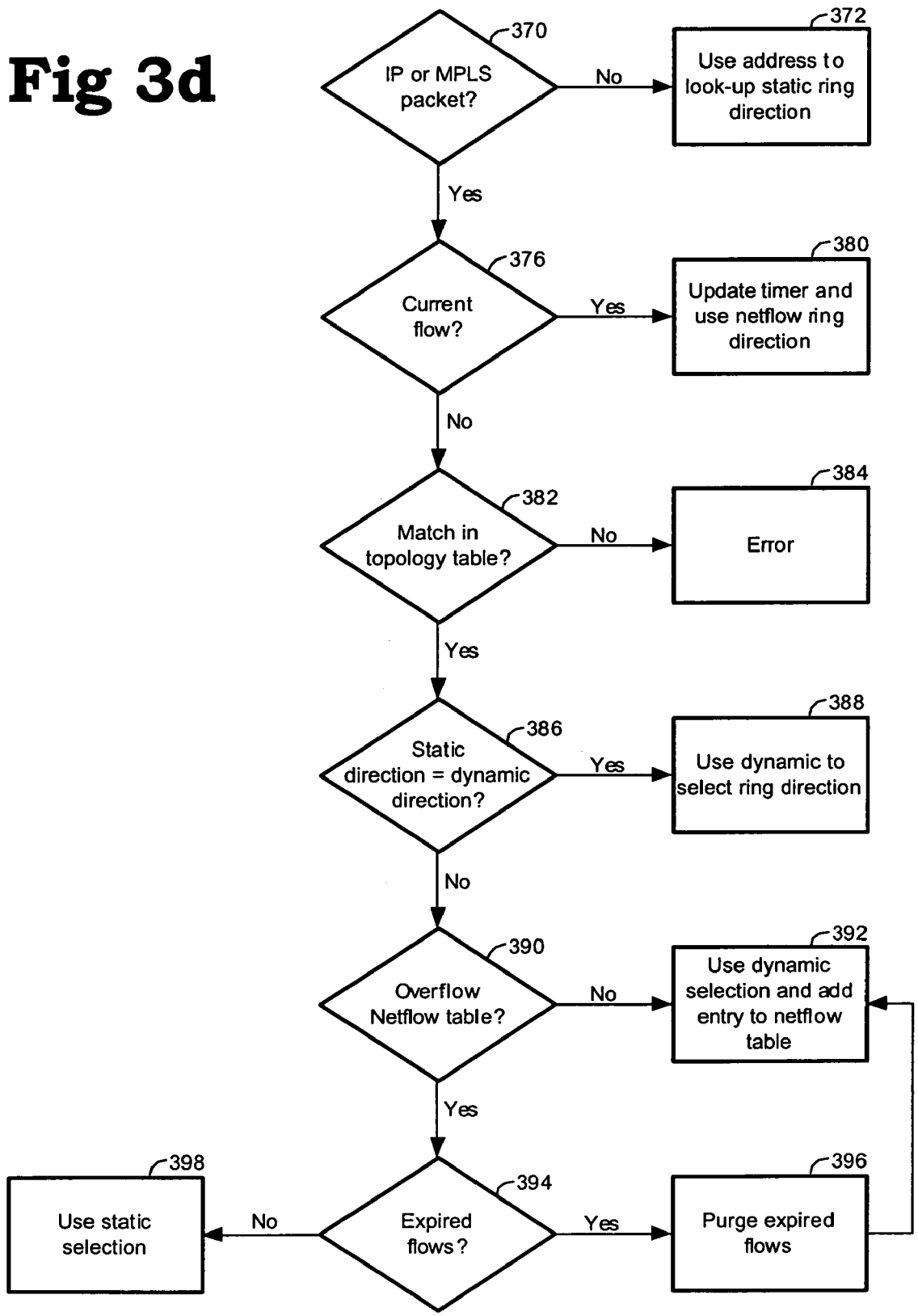
FIG. 3d is a flow chart illustrating a ring selection process including net flow processing.

In one implementation, the ring selection algorithm proposed above is augmented to include net flow processing. More specifically, a process that includes net flow processing is shown in FIG. 3d. The process begins by determining if the packet received is an IP or MPLS packet (370). If the packet received is not an IP or MPLS packet, then the destination MAC address for the packet is used to lookup the static ring direction in the topology table (372) and the static ring direction (shortest path) is used to route the packet. If the packet is an IP or MPLS packet, the destination MAC and IP address is used to determine if there is a current (unexpired) flow (376). If there is an unexpired flow, then the ring direction is determined to be the net flow ring direction and the timer for the flow is updated to reflect the current delay in the network (380). If there is an expired flow (376) or no cached flow (no entry in net flow table), then a check is made to determine if the there is match in the topology table for the destination address (382). If there is no match, then the packet is optionally dropped and an error is reported (384). If a match is detected in step 382, then a check is made to determine if the static ring direction and dynamic ring direction are the same (386). If so, the dynamic ring selection protocol is used to determine ring selection and the dynamic ring direction from the topology table is used to route the packet (388). If the dynamic ring direction (as determined as part of the dynamic ring selection protocol) is not the same as the static ring direction (the static ring selection), then a check is made to determine if the net flow table has overflowed (390). If no overflow is detected, then the dynamic ring direction is used and an entry is placed in the net flow table indicating the direction selection (392). If an overflow is detected, then a check is made in the net flow table for expired flows (394). If expired flows are found, then each may be purged from the net flow table (396) and the process continues at step 392. If no expired flows are located, then the static ring direction is used to route the packet (398). When a flow is active (i.e., an associated aging timer has not expired), the dynamic selection protocol is disabled for the given MAC address. During this time, the flow uses the static ring selection. The corresponding destination address of the flow in the table includes an aging timer that can be used to determine how long the dynamic ring selection protocol should be disabled. In one implementation, net flow information is added to a net flow table including the ring direction and initial timer value. Alternatively, net flow information can be included as part of the topology table.

In one implementation, entries are added to the net flow table whenever the dynamic ring direction does not match the static ring direction or when a packet is a multicast/broadcast packet. The net flow information can be stored in content addressable memory (CAM) or random access memory (RAM) with a hashing algorithm to lookup the entry.

Multicast/Broadcast Protocol

When multicast/broadcast packets are received, ring selection can be made based on a latency metric for the rings. A ring latency metric can be computed from the latency metric data for the plurality of downstream nodes on a given ring. The ring latency metric can be calculated to be the mathematical average of the latency metrics for the downstream nodes. In one implementation, the ring latency metric can be computed to be the average of a previously calculated ring latency metric and a newly calculated ring latency metric based on the current latency metric data for the downstream nodes. In one implementation, the ring topology table includes entries for Multicast/Broadcast MAC addresses and the computed latency metric for each ring.

A number of implementations of the invention have been described. Nevertheless, it will be understood that various modifications may be made without departing from the spirit and scope of the invention. For example, the aging timer has been described in terms of a count down timer. Other timers including ones that count up can be used. In one implementation, the net flow data can be including in the topology table. The topology table and/or the net flow table can be stored in a content addressable memory for faster look-ups. One or more numbered elements may be implemented with the same element. Accordingly, other implementations are within the scope of the following claims.

What is claimed is:

1. A method for servicing transmit traffic in a node of a network, the network including a plurality of nodes connected by first and second rings formed by two or more transmission media, the method comprising:

receiving usage data from a downstream node, the usage data including transit delay data associated with a plurality of downstream nodes;

receiving a packet for routing to the network;

determining a shortest path to a destination node including identifying one of the first and second rings as being associated with the shortest path;

in response to identifying one of the first and second rings as being associated with the shortest path to the destination node, determining if the identified one of the first and second rings is more congested than the other of the first and second rings using the transit delay data;

if so, routing the packet to the destination on the other ring irrespective of the shortest path determination;

wherein determining transit delay data for the node comprising appending the transit delay data for the node to the received transit delay data including:

identifying transit delay data associated with a node farthest away from the node; and dropping the transit delay data associated with the node farthest away from the node prior to appending the node's transit delay data; and forwarding the transit delay data including appended transit delay data to an upstream node.

2. A method for servicing transmit traffic in a node of a network, the network including a plurality of nodes connected by first and second rings formed by two or more transmission media, the method comprising:

receiving usage data from a downstream node, the usage data including transit delay data associated with a plurality of downstream nodes;

receiving a packet for routing to the network;

determining a shortest path to a destination node including identifying one of the first and second rings as being associated with the shortest path;

determining an average transit delay for each the plurality of nodes, the average transit delay computed as the average of a previously determined average transit delay for a given node and newly received delay data associated with the given node;

in response to identifying one of the first and second rings as being associated with the shortest path to the destination node, determining if the identified one of the first and second rings is more congested than the other of the first and second rings using the transit delay data; and if so, routing the packet to the destination on the other ring irrespective of the shortest path determination.

3. The method of claim 2 wherein the step of determining if the identified one of the first and second rings is more congested than the other of the first and second rings includes using the average transit delay data computed for each of the plurality of downstream nodes.

4. The method of claim 2 wherein the transit delay data is a measure of the amount of traffic in a low priority queue of a given downstream node.

5. A method for servicing transmit traffic in a node of a network, the network including a plurality of nodes connected by first and second rings formed by two or more transmission media, the method comprising:

receiving usage data from a downstream node, the usage data including transit delay data associated with a plurality of downstream nodes;

receiving a packet for routing to the network;

determining a shortest path to a destination node including identifying one of the first and second rings as being associated with the shortest path;

determining a latency metric, the latency metric indicative of a delay between the node and the destination node;

in response to identifying one of the first and second rings as being associated with the shortest path to the destination node, determining if the identified one of the first and second rings is more congested than the other of the first and second rings using the transit delay data and comparing the latency metrics associated with the destination node for each ring; and if so, routing the packet to the destination on the other ring irrespective of the shortest path determination; wherein the latency metric is computed as the mathematical average of a previously calculated latency metric indicative of a delay for nodes between the node and the given one of the plurality of downstream nodes and a newly calculated latency metric for a same path based on the received transit delay data.

6. A method for servicing transmit traffic in a node of a network, the network including a plurality of nodes connected by first and second rings formed by two or more transmission media, the method comprising:

receiving usage data from a downstream node, the usage data including transit delay data associated with a plurality of downstream nodes;

receiving a packet for routing to the network;

determining a shortest path to a destination node including identifying one of the first and second rings as being associated with the shortest path;

in response to identifying one of the first and second rings as being associated with the shortest path to the destination node, determining if the identified one of the first and second rings is more congested than the other of the first and second rings using the transit delay data;

if so, routing the packet to the destination on the other ring irrespective of the shortest path determination;

recognizing when a packet may be part of a flow;

storing flow information for a flow when a routing decision is made that routes a packet in a direction that is not consistent with the shortest path, the flow information including a flow direction selected and a timer;

receiving another packet that is part of the flow;

determining if a timeout period has expired since a last packet in the flow was sent based on the timer;

if the timeout period has not expired, then routing the another packet to the destination based on the flow information including in a direction determined by the flow direction; and updating the timer to reflect a start of a new timeout period.

7. The method of claim 6 further comprising setting the timer to an initial value that is the greater of the latency period between the node and the destination node on both rings.

8. The method of claim 7 wherein the step of updating the timer includes setting the timer to a new value that is the greater of a current latency period between the node and the destination node on both rings.

9. A method for servicing transmit traffic in a node of a network, the network including a plurality of nodes connected by first and second rings formed by two or more transmission media, the method comprising:

receiving usage data from a downstream node, the usage data including transit delay data associated with a plurality of downstream nodes;

receiving a packet for routing to the network;

determining a shortest path to a destination node including identifying one of the first and second rings as being associated with the shortest path;

calculating a latency metric as the mathematical average of a previously calculated latency metric and an average transit delay for all nodes between the node and the given destination node;

storing in a table of destination nodes a hop count reflecting a hop count between the node and the given destination node for each of the first and second rings, the latency metric reflecting the congestion between the node and the given destination node for each of the first and second ring, a static ring selection based on the hop count, and a dynamic ring selection based on the latency metrics reflective of the congestion in the first and second rings between the node and the given destination node;

in response to identifying one of the first and second rings as being associated with the shortest path to the destination node, determining if the identified one of the first and second rings is more congested than the other of the first and second rings using the transit delay data; and if so, routing the packet to the destination on the other ring irrespective of the shortest path determination.

10. The method of claim 9 wherein the average transit delay is weighted based on the number of hops between the node and the given destination node.

11. A node in a network including a plurality of nodes connected by first and second rings formed by two or more transmission media, the node comprising:

fairness logic configured to receive usage data from a downstream node including transit delay data associated with a plurality of downstream nodes;

receive a packet from a host associated with the node for routing to the network;

determine a shortest path to a destination node including identifying one of the first and second rings as being associated with the shortest path;

in response to identifying one of the first and second rings as being associated with the shortest path to the destination node, determine if the identified one of the first and second rings is more congested than the other of the first and second rings using the transit delay data; and if so, routing the packet to the destination on the other ring irrespective of the shortest path determination; and fairness logic configured to track flows associated with a node including remembering a last ring on which packets of the flow were forwarded to the node and setting a timer to a value reflective of a longest amount of time a packet will take to reach the node on either ring, receive a packet that is part of a flow and route the packet to the node using the last ring if the timer is unexpired.

* * * * *